United States Patent [19]
Robinson

[11] 3,819,242
[45] June 25, 1974

[54] BRAKE CAMSHAFT SUPPORT ASSEMBLY

[75] Inventor: James R. Robinson, Prattville, Ala.

[73] Assignee: Standard Forge and Axle Company, Incorporated, Montgomery, Ala.

[22] Filed: Mar. 30, 1973

[21] Appl. No.: 347,402

[52] U.S. Cl. ............................................. 308/36.1
[51] Int. Cl. ........................................... F16c 33/74
[58] Field of Search ............................ 308/36.1, 72

[56] References Cited
UNITED STATES PATENTS
3,076,683   2/1963   Hanley ............................. 308/36.1

*Primary Examiner*—Charles J. Myhre
*Assistant Examiner*—Frank Susko
*Attorney, Agent, or Firm*—Mason, Fenwick & Lawrence

[57] ABSTRACT

An assembly for supporting on the beam of an axle assembly, a brake camshaft having a slack adjustor removably mounted thereon by means of a spline connection, generally including a bracket rigidly mountable on the axle beam, a bushing mounted on the bracket in which the camshaft is journaled adjacent the spline connection between the camshaft and the slack adjustor, means for lubricating the bearing surface of the bushing, and at least one relief passageway communicating with the lubricating means and communicable with the spline connection between the camshaft and the slack adjustor whereby upon lubricating the bushing, any excess pressure developed in the lubricating means of the bushing will be relieved by the escape of lubricant under pressure through the relief passageway which is supplied to the spline connection between the camshaft and the slack adjustor.

16 Claims, 7 Drawing Figures

BRAKE CAMSHAFT SUPPORT ASSEMBLY

This invention relates to axle assemblies and more particularly to an assembly for supporting on the beam of an axle assembly, a brake camshaft having a slack adjustor removably mounted thereon by means of a spline or functionally equivalent connection. This invention further contemplates a novel bushing and further a novel bracket comprising components of such brake camshaft support assembly.

Conventional nonsteering axle assemblies in the prior art generally have consisted of a beam having spindles mounted on the ends thereof, bearings mounted on the spindles, hubs mounted on the spindles, and brake drums mounted on the hubs for rotation therewith. In addition, such assemblies generally have included brake assemblies mounted on the beam adjacent the spindles, cooperable with the brake drums to provide a braking action, brake camshafts operatively connected at their outer ends to the brake assemblies and supported at their inner ends on support assemblies mounted on the axle beam, for actuating the brake assemblies, and air chambers mounted on the axle beam having actuating linkages for rotating the brake camshafts to actuate the brake assemblies, including slack adjustors removably mounted on the inner ends of the brake camshafts by means of spline connections.

In such assemblies, the brake camshaft support assemblies basically have consisted of a post member welded at its base to the axle beam, and a bushing mounted on the upper end of the post member adjacent the spline connection between the brake camshaft and the slack adjustor, in which the outer end of the brake camshaft is journaled. Usually, such bushings are provided with means for lubricating the bearing surfaces thereof in contact with the brake camshafts and O-rings for preventing leakage of such lubricant. Lubrication of such bushings has been accomplished in the conventional manner by the use of lubricating guns for injecting lubricant under pressure into the bushing.

In performing routine maintenance on such axle assemblies, it was found that whenever excess pressure was used in lubricating the bushings of the brake camshaft support assemblies, the bushings would split, thereby necessitating their removal and replacement. It further was found that either a lack of lubrication or insufficient lubrication of the spline connection between the brake camshaft and the slack adjustor can cause the slack adjustor to freeze on the camshaft thus making difficult its removal.

The problem of the splitting of bushings upon the application of excess pressures during lubrication has been eliminated by providing a relief passageway in the bushing. Normally, such passageway consists of a hole drilled in the bushing, communicating with the lubricating grooves in the bore surface of the bushing, through which lubricant under pressure might escape. It further has been found, however, that such type of pressure relief is not entirely satisfactory in that it results in the loss of lubricant escaping through the relief passageway.

Accordingly, it is the principal object of the present invention to provide an improved assembly for supporting a brake camshaft in an axle assembly.

Another object of the present invention is to provide an improved assembly for supporting the brake camshaft of an axle assembly, including a bracket and a bushing mounted in the bracket for supporting a portion of the camshaft wherein improved means are provided for relieving excess lubricant pressure in such bushing.

A further object of the present invention is to provide an improved assembly for supporting the brake camshaft of an axle assembly adjacent a spline connection between an inner end of the brake camshaft and a slack adjustor mounted on the end of the brake camshaft, having means for lubricating such spline connection.

A still further object of the present invention is to provide an improved assembly for supporting the brake camshaft of an axle assembly, including a bracket and a bushing mounted on the bracket for supporting the brake camshaft wherein the bushing permits universal movement of the camshaft, means are provided for relieving excess lubricant pressures in such bushing, and excess lubricant discharged from the bushing is recovered and utilized to lubricate other parts of the axle assembly.

Another object of the present invention is to provide an improved assembly for supporting the brake camshaft of an axle assembly which is comparatively simple in construction, relatively inexpensive to manufacture and easily assembled and disassembled.

Another object of the present invention is to provide an assembly for supporting the brake camshaft of an axle assembly, having a novel bracket construction.

A further object of the present invention is to provide an improved assembly for supporting to brake camshaft of an axle assembly, having a novel bushing construction.

Other objects and advantages of the present invention will become more apparent to those persons having ordinary skill in the art to which the invention pertains, from the following description taken in conjunction with the accompanying drawings wherein.

Figure 1:
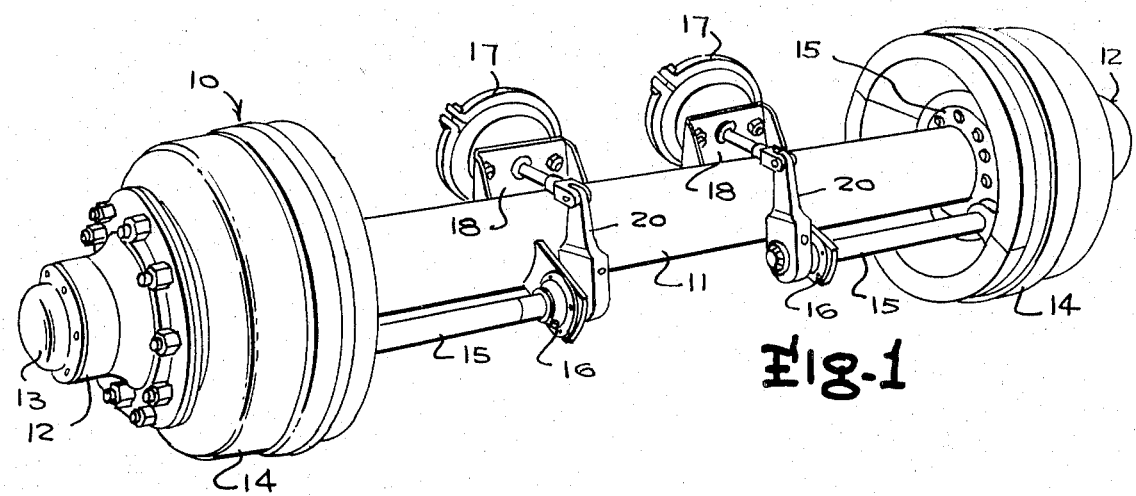
FIG. 1 is a perspective view of an axle assembly in which the invention is used.
Figure 2:
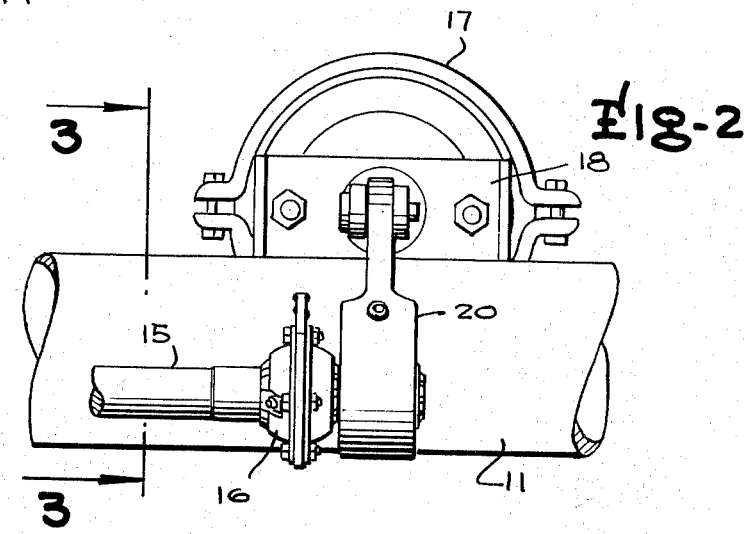
FIG. 2 is an enlarged, top plan view of a portion of the assembly shown in FIG. 1, illustrating the brake camshaft support assembly embodying the present invention.
Figure 3:
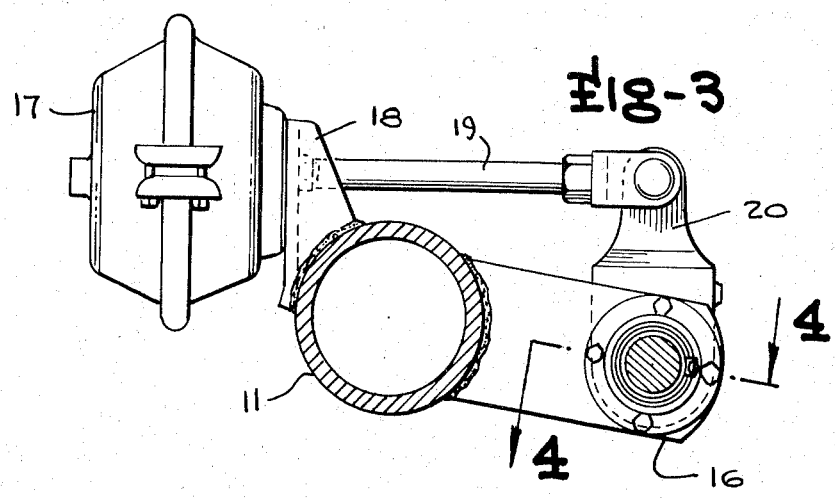
FIG. 3 is a cross sectional view taken along line 3—3 in FIG. 2.

Referring to FIG. 1 of the drawings, there is illustrated an axle assembly 10 incorporating the use of the present invention. Generally, the axle assembly includes an axle beam 11 normally consisting of a tube having a circular, square or rectangular cross sectional configuration, spindles mounted on the ends of the beam, bearings mounted on the spindles, hubs 12 mounted on the bearings and provided with appropriate seals and hub caps 13, brake drums 14 mounted on the hubs, and brake assemblies 15 mounted on the ends of the beam and cooperable with the hubs 14 to provide a braking action in the conventional manner. The axle assembly further is provided with brake camshafts 15 operatively connected at their outer ends to the brake shoes of the brake assemblies and supported at their inner ends by support assemblies 16, and air chambers 17. The air chambers are detachably mounted on brackets 18 rigidly secured to the axle beam by welding, and are provided with reciprocable actuating arms 19 pivotally connected at the ends thereof to slack adjustors 20. As best illustrated in FIG. 2, the slack adjustors are mounted on the ends of the brake camshafts 15, adjacent the support assemblies 16 by means of spline connections. In such an assembly, it will be appreciated that upon actuation of the brake system of the vehicle, air chambers 17 will cause arm members 19 to extend thus rotating the brake camshafts through the slack adjustors to cam the brake shoes apart into engagement with the brake drums to provide a braking action in the conventional manner.

Figure 4:
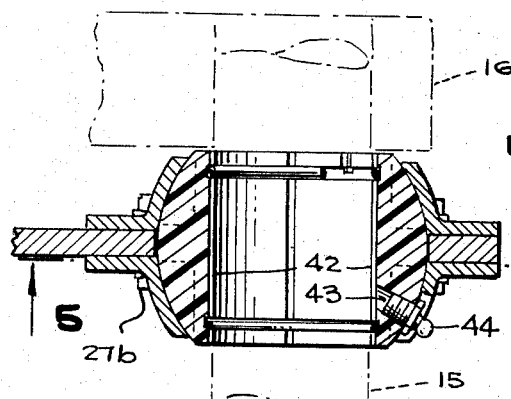
FIG. 4 is an enlarged cross sectional view taken along line 4—4 in FIG. 3.
Figure 5:
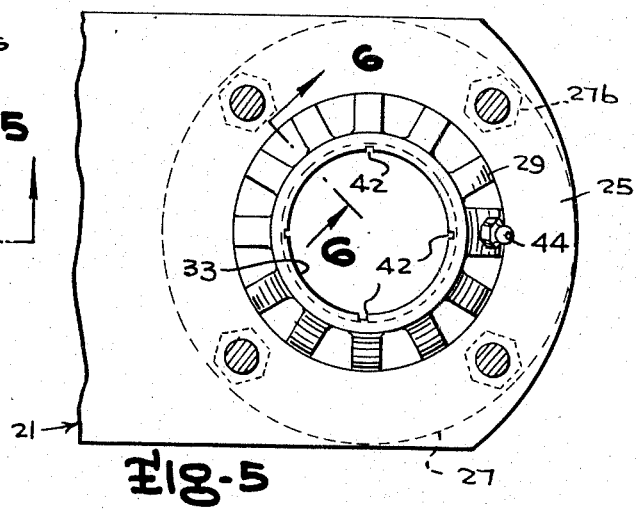
FIG. 5 is a cross sectional view taken along line 5—5 in FIG. 4.
Figure 6:
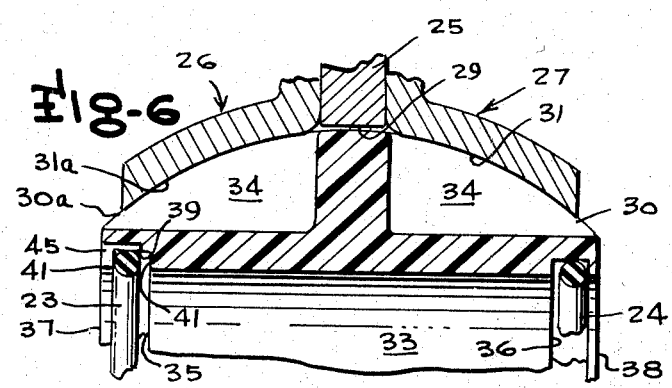
FIG. 6 is an enlarged cross sectional view taken along line 6—6 in FIG. 5.
Figure 7:
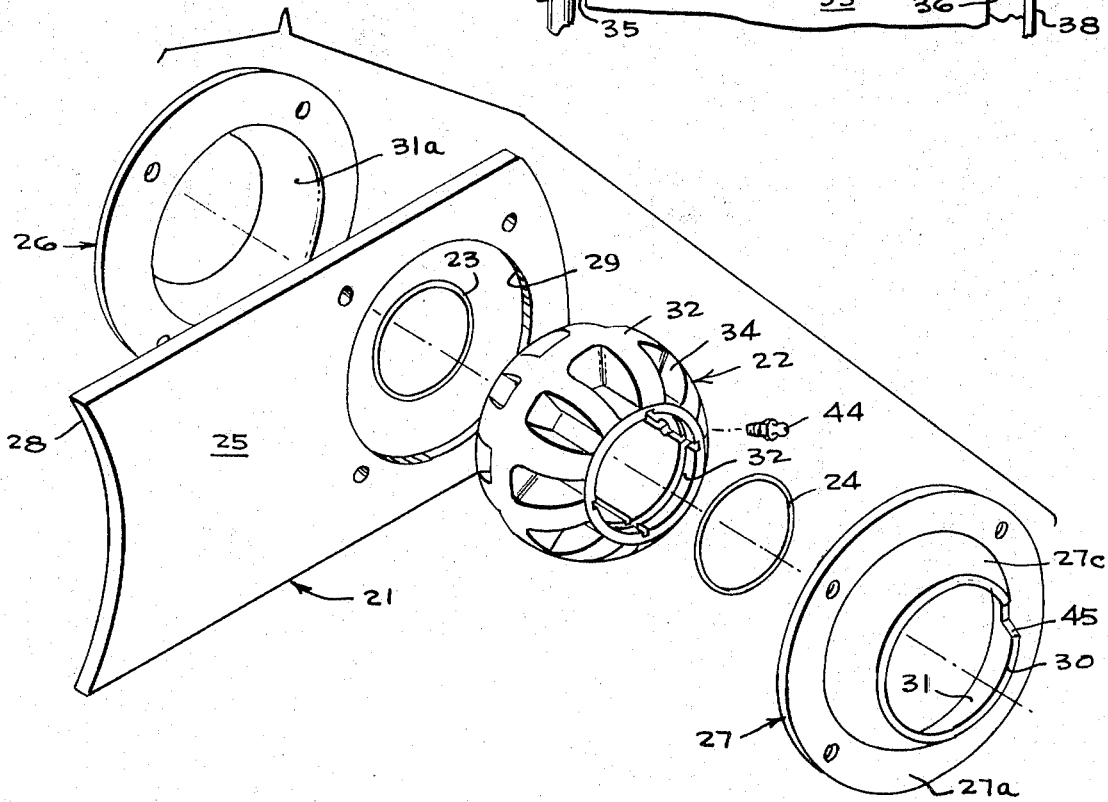
FIG. 7 is an exploded perspective view of the brake camshaft support assembly illustrated in FIGS. 1 through 6.

FIGS. 4 through 7 best illustrate the support bracket 16 which generally consists of a bracket 21, a bushing 22 mounted in the bracket and O-rings 23 and 24. The bracket further consists of a post member 25 and substantially identical retainer members 26 and 27. The post member is substantially elongated, having an arcuate inner edge 28 provided with a radius of curvature substantially similar to the radius of curvature of the axle beam and which is mounted and secured rigidly on the axle beam by welding, and a circular opening 29 disposed at the outer end thereof. Retainer member 27, being substantially similar in construction to retainer member 26, includes an annular flange portion 27a mountable on a side of post member 25 by means of bolts and nuts 27b and an annular cap portion 27c having an opening 30. As best shown in FIGS. 4 and 6, the inner diameter of the flange portions of the retainer members are substantially equal to the diameter of the opening 29 of the post member, and the inner surfaces 31 and 31a of the cap portions thereof have spherical configurations whereby upon mounting the retainer members on the post member by means of the bolts and nuts 27b, the retainer members will be disposed coaxially relative to opening 29 in the post member, circular opening 29 and inner spherically-shaped surfaces 31 and 31a of the retainer members will cooperate to define a spherically-configured socket for seating bushing 22, and openings 30 and 30a of the retainer members also will be axially aligned for receiving the outer portions of the bushings therethrough and accomodating the outer end of the brake camshaft journaled in the bushing.

Bushing 22 has a substantially spherical outer surface 32 provided with a diameter substantially equal or slightly less than the diameter of socket 31, and a diametrically disposed bore 32 having a smooth, continuous cylindrical bearing surface 33 in which the brake camshaft is journaled. The bushing may be constructed of any suitable material having sufficient strength and wear properties, preferably Nylon, and may be fabricated by any suitable method, usually by die casting. The bushing further may be formed with circumferentially spaced recesses 34 to conserve material and reduce the contact surface of the bushing with the bracket.

The cylindrical surface of the bore in the bushing is provided with a pair of annular grooves 35 and 36 disposed adjacent the end faces 37 and 38 of the bushing for seating O-rings 23 and 24 which are adapted to engage portions of the brake camshaft journaled in the bore 32, in sealing relation. As best illustrated in FIG. 6, annular seating groove 35 is provided with an annular bottom wall 39, an annular inner side wall 40 and an annular outer side wall 41. To lubricate the portion of the brake camshaft journaled in the bushing, cylindrical surface 33 of the bushing bore is provided with a plurality of longitudinally disposed, circumferentially spaced grooves 42 which communicate with annular seating grooves 35 and 36, and one of which communicates with a lubricant supply passageway 43 provided with a lubricant fitting 44 mounted in the bushing and projecting through a cut-out portion 45 of retainer member 27.

The bushing is lubricated in the conventional manner by connecting a lubricating gun to the lubricant fitting 44 and forcing lubricant under pressure through supply passageway 43, communicating lubricating groove 42 and annular seating grooves 35 and 36 to the other lubricating grooves 42. As illustrated in FIG. 6, the widths of seating grooves 35 and 36 are slightly larger than the diameters of O-rings 23 and 24 to permit intercommunication of lubricant between lubricating grooves 42 through the annular seating grooves.

Cylindrical wall 33 of the bushing bore further is provided with a plurality of longitudinally disposed, circumferentially spaced relief grooves 45, each having a depth slightly greater than the depth of annular seating groove 45 and extending from outer end face 37 and inwardly to a point outwardly of annular inner side wall 40 of seating groove 35.

When the camshaft support assembly is mounted on the axle assembly, the bushing end face 37 is positioned sufficiently adjacent to the slack adjustor 16 so that whenever the bushing is lubricated, any excess lubricant pressure which might otherwise cause the bushing to split, will cause lubricant under pressure to flow into annular seating passageway 35, forcing O-ring 23 outwardly, by-pass O-ring 23 and flow through passageways 45 which conduct the excess lubricant to the spline connection between the end of the brake camshaft and the slack adjustor. Such excess lubricant thus is recovered and utilized to perform a useful function, i.e., lubrication of the spline connection thereby preventing the slack adjustor from freezing on the brake camshaft and, correspondingly, facilitating its removal.

The brake camshaft support assembly 16 can be assembled simply by inserting O-rings 23 and 24 in seating grooves 35 and 36, inserting fitting 44 into supply passageway 44, placing the bushing in opening 29 of the post member and positioning the retainer members 26 and 27 on the post member with the spherical surfaces 31 and 31a cooperating with opening 29 to form socket 31 and seat the bushing therein with fitting 44 projecting through the cut-out portion 45 of retainer member 27, and securing the retainer members to the post member by means of nuts and bolts 27b. The support assembly then may be mounted on the axle beam 11 by positioning the arcuate surface 28 of the post member on the axle beam and welding the post member to the axle beam. The brake camshaft then may be inserted through the bushing of the support assembly so that the spline portion thereof projects beyond bushing end face 37. The slack adjustor 20 then is mounted on the end of the brake camshaft and connected to the actuating arm of the air chamber. As previously indicated, the opposite end of the brake camshaft provided with the conventional S-shaped cam would be operatively connected to the brake assembly so that upon rotation of the brake camshaft, the shoes of the brake assembly will be forced apart into engagement with the brake drum to provide a braking action.

The simple construction of the bracket 21 facilitates both the fabrication and assembly and disassembly thereof. It is contemplated that post member 25 and retainer members 26 and 27 be fabricated by stamping such pieces from plate stock. The simple configurations of such members and the identical configuration of retainer members 26 and 28 permit the use of two simple dies thus reducing the tooling costs of such components.

From the foregoing detailed description, it will be evident that there are a number of changes, adaptations and modifications of the present invention which will come within the province of those persons having ordinary skill in the art. However, it is intended that all such variations not departing from the spirit of the invention be considered as within the scope thereof as limited solely by the appended claims.

I claim:

1. An assembly for supporting on the beam of an axle assembly, a brake camshaft having a slack adjustor removably mounted thereon by means of a spline connection, comprising a bracket rigidly mountable on said axle beam, said bracket having means defining a socket, a bushing mountable in said socket, said bushing having a bore therethrough for receiving and supporting a portion of said brake camshaft adjacent the spline connection thereof with said slack adjustor, said bore having a smooth, continuous cylindrical wall surface provided with a pair of axially spaced, annular seating grooves and a plurality of lubricating grooves interconnecting said annular grooves, said bushing having a lubricating fitting, a supply passageway intercommunicating said lubricating fitting and one of said lubricating grooves, at least one relief passageway communicating with one of said annular seating grooves and communicable with said spline connection, O-rings disposed in said annular grooves, engageable in sealing relationship with portions of a camshaft mounted within the bore of said bushing, and said annular groove communicable with said relief passageway having a width slightly larger than the diameter of the O-ring seated therein, said O-ring seated in said annular groove communicating with said relief passageway being shiftable in the seating groove thereof and thus capable of obstructing the communication of said lubricating grooves and said relief passageway, whereby excess pressure developed in said lubricating passageways during lubrication of said bushing will be relieved by the escape of lubricant under pressure through said annular groove communicating with said relief passageway, by-passing the O-ring seated therein, and said relief passageway to be supplied to said spline connection between said brake camshaft and said slack adjustor.

2. An assembly according to claim 1 including a plurality of circumferentially spaced relief passageways.

3. An assembly according to claim 2 wherein said relief passageways communicate only with one or both of the bottom annular surface and outer side annular surface of said annular groove communicable with said relief passageways.

4. An assembly according to claim 1 including a plurality of relief passageways consisting of longitudinally disposed grooves in said cylindrical wall surface, each having a depth greater than the depth of said annular groove communicating with said relief passageway, and extending from an outer face of said bushing to a point outwardly of the inner side wall of said annular groove communicating with said relief passageway.

5. An assembly according to claim 1 wherein said lubricating grooves consist of a plurality of longitudinally disposed, circumferentially spaced grooves.

6. An assembly according to claim 1 wherein the socket in said bracket has a spherical configuration, and said bushing mountable in said socket similarly has a spherical configuration.

7. An assembly according to claim 1 wherein said bushing is formed of Nylon.

8. An assembly according to claim 1 wherein said bracket includes a post member mountable on said axle beam and having a circular opening therein, and a pair of retainer members each having a portion providing a seating wall with a spherical configuration and an opening therein and a flange portion rigidly mounted on a side of said post member whereby the circular opening of said post member and said seating surfaces of said retainer members cooperate to provide said socket for seating said bushing, and said openings in said retainer members are aligned for receiving said brake camshaft therethrough.

9. A bushing mountable in the socket of a bracket rigidly mounted on the beam of an axle assembly for supporting a brake camshaft having a slack adjustor removably mounted thereon by means of a spline connection, comprising a body having a bore therethrough for receiving and supporting a portion of said brake camshaft, said bore having a smooth, continuous cylindrical wall surface provided with a pair of axially spaced, annular seating grooves and a plurality of lubricating grooves interconnecting said annular grooves, said bushing having a lubricating fitting, a supply passageway intercommunicating said lubricating fitting and one of said lubricating grooves, at least one relief passageway communicating with one of said annular seating grooves and communicable with said spline connection when said body is mounted in the socket of said bracket, O-rings disposed in said annular grooves, engageable in sealing relationship with portions of a camshaft mounted within the bore in said body, and said annular groove communicable with said relief passageway having a width slightly larger than the diameter of the O-ring seated therein, said O-ring seated in said annular groove communicating with said relief passageway being shiftable in the seating groove thereof and thus capable of obstructing the communication of said lubricating grooves and said relief passageway, whereby excess pressure developed in said lubricating passageways during lubrication of said body when mounted on the camshaft will be relieved by the escape of lubricant under pressure through said annular groove communicating with said relief passageway, by-passing the O-ring seated therein, and said relief passageway to be supplied to said spline connection between said brake camshaft and said slack adjustor.

10. A bushing according to claim 9 including a plurality of circumferentially spaced relief passageways.

11. A bushing according to claim 10 wherein said relief passageways communicate only with one or both of the bottom annular surface and outer side annular surface of said annular groove communicable with said relief passageways.

12. A bushing according to claim 9 including a plurality of relief passageways consisting of longitudinally disposed grooves in said cylindrical wall surface, each having a depth greater than the depth of said annular groove communicating with said relief passageway, and extending from an outer face of said body to a point outwardly of the inner side wall of said annular groove communicating with said relief passageway.

13. A bushing according to claim 9 wherein said lubricating grooves consist of a plurality of longitudinally disposed, circumferentially spaced grooves.

14. A bushing according to claim 1 wherein the body has substantially a spherical configuration.

15. A bushing according to claim 9 wherein said body is formed of Nylon.

16. A bracket mountable on the beam of an axle assembly having a socket for seating a bushing supporting a brake camshaft comprising a post member mountable on said axle beam and having a circular opening therein, and a pair of retainer members each having a portion providing a seating wall with a spherical configuration and an opening therein and a flange portion rigidly mounted on a side of said post member whereby the circular opening of said post member and said seating surfaces of said retainer members cooperate to provide said socket for seating said bushing, and said openings in said retainer members are aligned for receiving said brake camshaft therethrough.

* * * * *